United States Patent
Kuroda et al.

(10) Patent No.: US 9,472,941 B2
(45) Date of Patent: Oct. 18, 2016

(54) BATTERY MODULE

(71) Applicant: Kabushiki Kaisha Toshiba, Tokyo (JP)

(72) Inventors: Kazuto Kuroda, Tokyo (JP);
Shinichiro Kosugi, Yokohama (JP);
Minoru Gyoda, Tokorozawa (JP);
Fuyuki Kanbe, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 413 days.

(21) Appl. No.: 14/204,186

(22) Filed: Mar. 11, 2014

(65) Prior Publication Data

US 2014/0265639 A1    Sep. 18, 2014

(30) Foreign Application Priority Data

Mar. 15, 2013  (JP) .................................. 2013-054226

(51) Int. Cl.
H02H 3/12    (2006.01)
H02H 7/18    (2006.01)

(52) U.S. Cl.
CPC .................. *H02H 3/12* (2013.01); *H02H 7/18* (2013.01); *Y10T 307/865* (2015.04)

(58) Field of Classification Search
CPC ....... H02H 3/12; H02H 7/18; Y10T 307/865
USPC ........ 307/10.7, 131; 320/134, 136, 149, 165
See application file for complete search history.

(56) References Cited

U.S. PATENT DOCUMENTS

| | | | |
|---|---|---|---|
| 7,759,903 B2 * | 7/2010 | Kamata ................. | G01R 31/362 320/132 |
| 2013/0106356 A1 * | 5/2013 | Nakao ................. | B60L 11/1864 320/118 |

FOREIGN PATENT DOCUMENTS

| | | |
|---|---|---|
| JP | H0950827 A | 2/1997 |
| JP | 2009-277647 A | 11/2009 |
| JP | 2009268211 A | 11/2009 |
| JP | 2012251979 A | 12/2012 |
| WO | 2009067783 A1 | 6/2009 |

OTHER PUBLICATIONS

Office Action issued in related Japanese Application No. 2013-054226, mailed Aug. 9, 2016 (4 pages).

* cited by examiner

*Primary Examiner* — Richard Tan
(74) *Attorney, Agent, or Firm* — Baker Botts L.L.P.

(57) ABSTRACT

According to one embodiment, battery module includes a main circuit, a resistive element, a current-amount detection circuit, and a breaker. A charge and discharge current of a battery flows through the main circuit via a positive connecting terminal and a negative connecting terminal. The resistive element is provided in a current path branched from the main circuit, and able to form a closed circuit with an external control device via one of the positive connecting terminal and the negative connecting terminal while an insulating state between the main circuit and the external control device is maintained. The current-amount detection circuit detects an amount of current flowing through the resistive element, and outputs a current-amount detection signal. The breaker circuit interrupts the current flowing through the main circuit when the amount of current flowing through the resistive element is smaller than a predetermined threshold current based on the current-amount detection signal.

8 Claims, 4 Drawing Sheets

BATTERY MODULE

CROSS-REFERENCE TO RELATED APPLICATIONS

This application is based upon and claims the benefit of priority from Japanese Patent Application No. 2013-054226, filed on Mar. 15, 2013, the entire contents of which are incorporated herein by reference.

FIELD

Embodiments described herein relate generally to a battery module.

BACKGROUND

Conventionally, to apply a lithium-ion battery (LIB) to industrial equipment or in-car equipment, it is necessary to connect multiple cells in series to form a battery assembly because a voltage produced by a single cell is low.

In contrast, a number of mid-size and large-size electrically-powered equipment using a lead battery with the average operating voltage of about 48 volts (V) have been provided.

In recent years, there is a growing trend to replace a lead battery with a high-performance lithium-ion battery. In this case, for example, a mid-size or large-size electrically-powered equipment with the average operating voltage of 48 V is required to operate with the maximum charge voltage of 60 V and the discharge cut-off voltage (minimum discharge voltage) of about 30 V that is the lower limit of the performance of a motor of the equipment.

Incidentally, to meet a demand to supply a large amount of power, a system using the battery assembly as a drive power supply or an auxiliary power supply is increasingly required to have a large capacity to improve performance and increase uptime.

Therefore, in order to meet the aforementioned demand, there has been used a battery assembly device comprising battery groups connected in parallel with each other. Here, each of the battery groups is formed by connecting a number of batteries in series.

Meanwhile, to simplify battery handling, in some cases, a battery module may be formed by connecting multiple batteries in parallel or in series as a module.

Furthermore, in some cases, a battery management unit (BMU) may be used as a control device to control multiple battery modules of the battery assembly device.

In this case, the BMU and each of the battery modules are connected via a communication connector included in a communication line for control and via a positive connector (positive connection cable) and a negative connector (negative connection cable) included in a power supply line.

Incidentally, in some cases, the positive connector or the negative connector may be disconnected for maintenance to check a deterioration or failure of a battery of the battery module while the communication connector remains connected.

When the positive connector or the negative connector is disconnected while the communication connector remains connected, and if the positive connector and the negative connector are erroneously connected to reestablish the power supply line, a short circuit condition occurs.

Therefore, a fuse element may fuse and the reestablishment may become burdensome.

DETAILED DESCRIPTION

In general, according to one embodiment, a battery module comprises a main circuit, a resistive element, a current-amount detection circuit, and a breaker circuit. A charge and discharge current of a battery flows through the main circuit via a positive connecting terminal and a negative connecting terminal. The resistive element is provided in a current path branched from the main circuit, and able to form a closed circuit with an external control device via one of the positive connecting terminal and the negative connecting terminal while an insulating state between the main circuit and the external control device is maintained. The current-amount detection circuit detects an amount of current flowing through the resistive element, and outputs a current-amount detection signal. The breaker circuit interrupts the current flowing through the main circuit when the amount of current flowing through the resistive element is smaller than a predetermined threshold current based on the current-amount detection signal.

Embodiments will be explained below with reference to the accompanying drawings.

Figure 1:
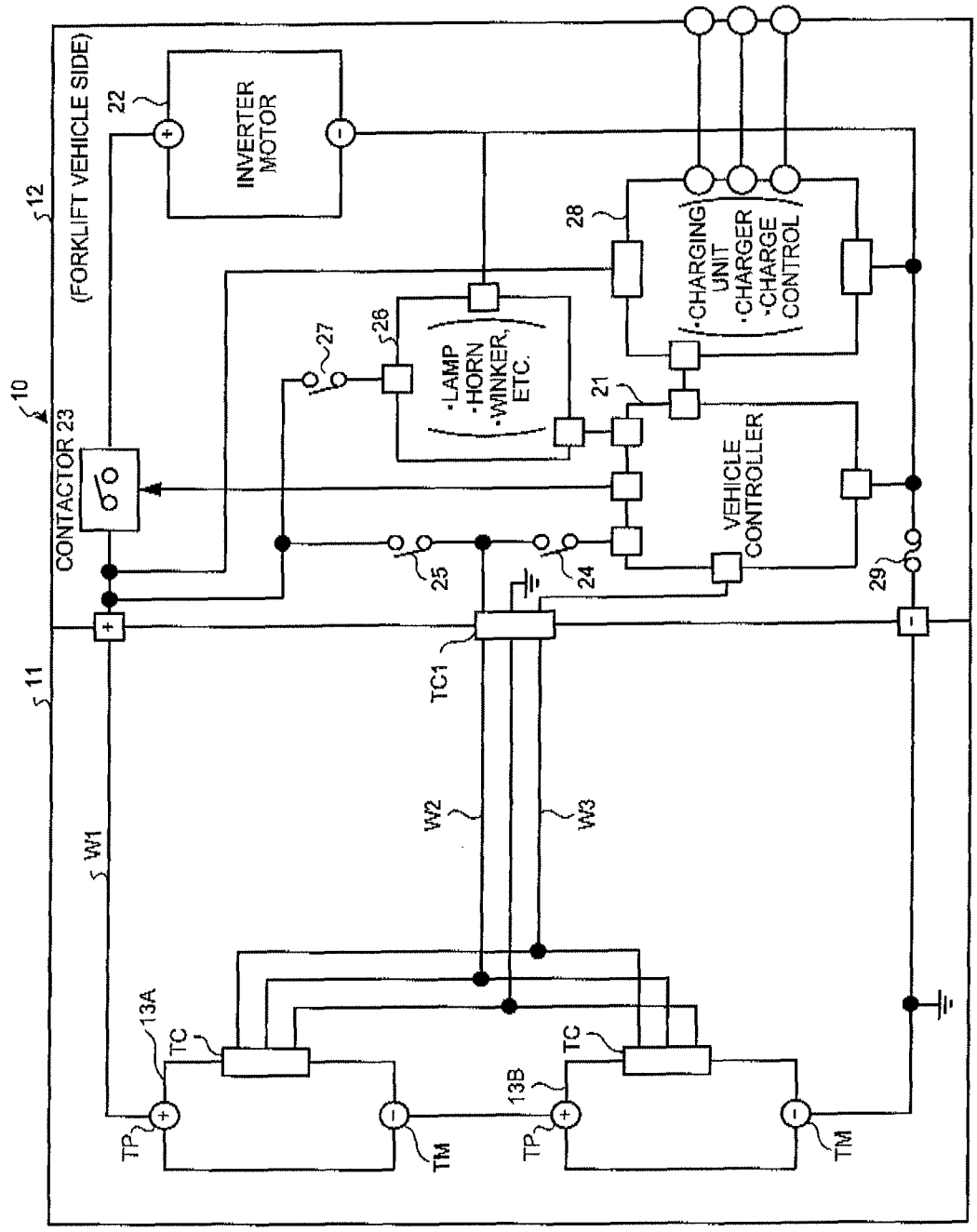
FIG. 1 is a block diagram illustrating a schematic configuration of an electrical system of an electric forklift when a battery assembly system is mounted on the electric forklift, according to an embodiment.

FIG. 1 is a block diagram illustrating a schematic configuration of an electrical system of an electric forklift when a battery assembly system according to an embodiment is mounted on the electric forklift.

An electrical system 10 of the electric forklift includes, when broadly divided: a battery module system 11 (an example of a power supply device or a power supply control device) that supplies power to drive the electric forklift; and a forklift electrical system unit 12 that performs operation to charge the battery module system 11 and operation to receive power from the battery module system 11.

The battery module system 11 includes multiple battery modules 13A and 13B that are connected in series.

The forklift electrical system unit 12 includes: a vehicle controller (ETC) 21 that controls the entire forklift electrical system unit 12; an inverter motor 22 that is driven under the control of the vehicle controller 21; a contactor 23 that supplies power from the battery module system 11 to the inverter motor 22 under the control of the vehicle controller 21; an interlock switch 24 that enters an ON state upon detecting that an operator is in a correct operation position (for example, a correct seated position); a key switch 25 that enters an ON state in accordance with key operation performed by the operator; and an auxiliary machine group 26 that includes auxiliary machines, such as a head lamp, a warning horn, and a blinker (traffic indicator).

The forklift electrical system unit 12 further includes: an auxiliary machine group switch 27 that supplies driving power to the auxiliary machine group 26 in accordance with key operation performed by the operator; a charging unit 28 that is connected to an external commercial power supply (for example, a three-phase alternating-current (AC) power supply) and that charges a battery pack module 14 of the battery module system 11 in accordance with a charge control signal output by the battery module system 11; and a fuse element 29 that fuses due to overcurrent flowing through the inverter motor 22 when overvoltage occurs.

An overview of the operation performed by the electrical system 10 of the electric forklift will be described below.

In a normal operating state, the interlock switch 24 enters the ON state when an operator reaches a correct operation position. The auxiliary machine group switch 27 is always maintained in the ON state to enable the auxiliary machines, such as a head lamp, a warning horn, and a blinker (traffic indicator), to operate.

Subsequently, when the operator continues the key operation, the key switch 25 enters the ON state. When the key switch 25 enters the ON state, power is supplied to a second wiring W2 and the vehicle controller 21.

Then, the battery modules 13A and 13B are notified that the vehicle is activated, and the battery modules 13A, 13B and the vehicle controller 21 start communicating with each other via a third wiring W3. Specifically, when the interlock switch 24 and the key switch 25 enter the ON states, the inverter motor 22 enters a drivable state. Accordingly, the vehicle controller 21 causes the contactor 23 to enter the ON state.

Therefore, the battery modules 13A and 13B of the battery module system 11 supply power to the inverter motor 22 via a first wiring W1.

As a result, the inverter motor 22 enters a driven state and the electric forklift is driven and is operated by the operator.

Furthermore, in a charging operation state, an external commercial power supply (for example, a three-phase AC power supply) is connected to the charging unit 28 to charge the battery modules 13A and 13B of the battery module system 11.

Incidentally, the battery modules 13A and 13B are always maintained in charge and discharge enabled states even when the vehicle is stopped, but are put into charge and discharge disabled states at the time of maintenance, such as when the modules are assembled, for the sake of safety. As an example of a method to put the battery modules in the charge and discharge disabled states into the charge and discharge enabled states (to activate the battery modules), it may be possible to infallibly charge the battery modules at the time of activation and activate the battery modules upon detecting that a voltage is applied to positive connectors TP and negative connectors TM of the battery modules 13A and 13B.

Figure 2:
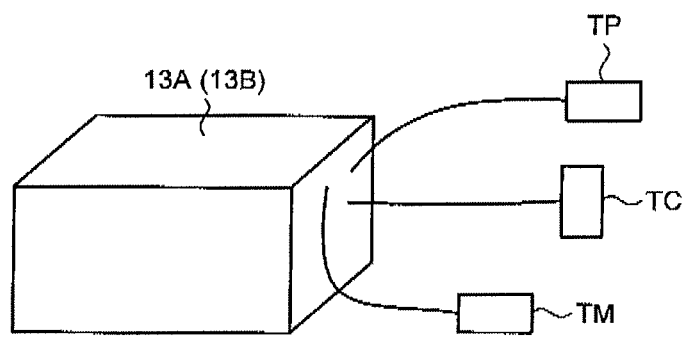
FIG. 2 is a perspective external view of a battery module according to the embodiment.

FIG. 2 is a perspective external view of the battery module.

As illustrated in FIG. 2, each of the battery modules 13A and 13B is configured such that the positive connector TP, a communication connector TC, and the negative connector TM are drawn from a box-shaped main body of the battery module.

Therefore, as illustrated in FIG. 1, in a normal use state, the positive connector TP of the battery module 13A is connected to a high-potential side of the first wiring W1 and to a high-potential supply terminal of a battery management apparatus 15.

In contrast, the negative connector TM of the battery module 13A is connected to the positive connector TP of the battery module 13B.

Furthermore, the negative connector TM of the battery module 13B is connected to a low-potential side of the first wiring W1 and to a low-potential supply terminal of the vehicle side 12.

Furthermore, the communication connectors TC of the battery modules 13A and 13B are connected to a communication connector TC1 of the battery management apparatus 15 via communication cables, and the communication connectors TC and the communication connector TC1 are electrically connected to a reference potential (ground potential) of the vehicle side 12 (common electrical ground).

Figure 3:
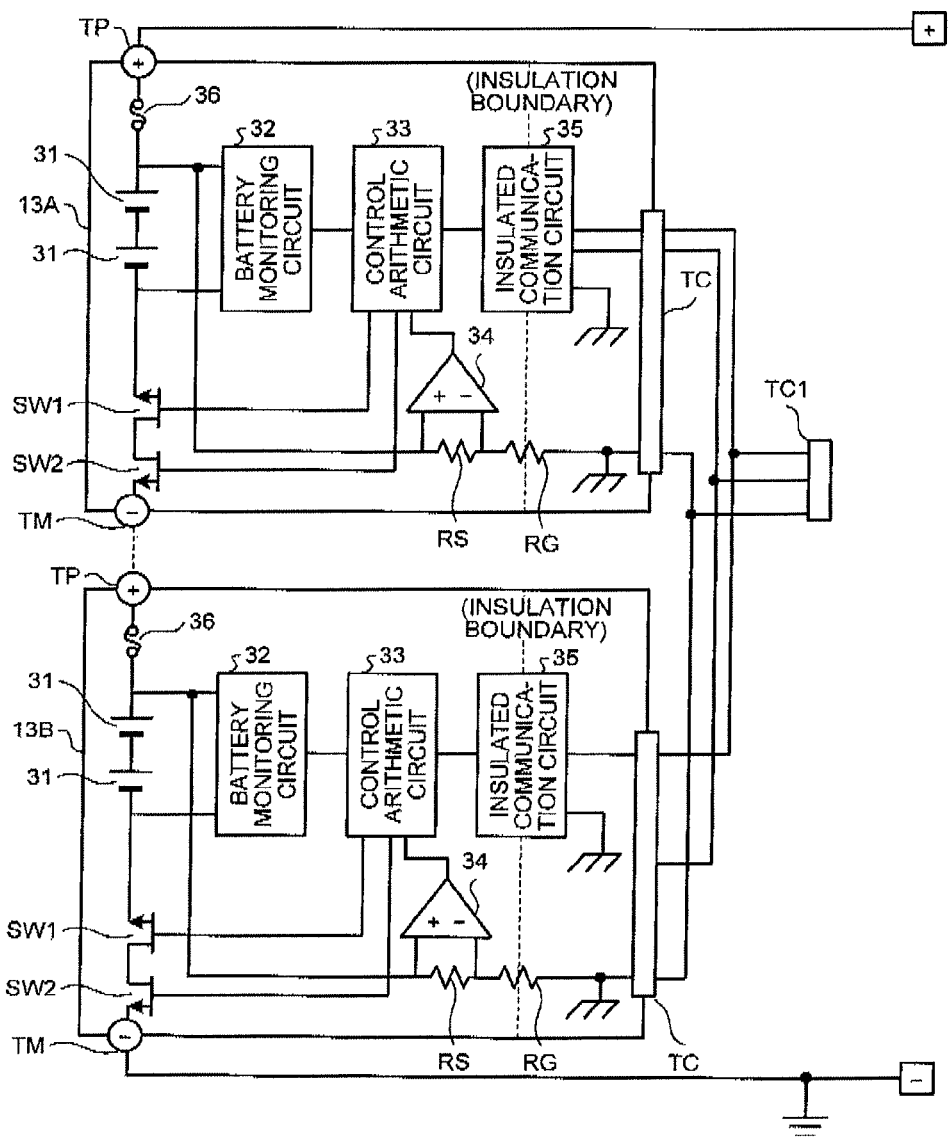
FIG. 3 is a block diagram of a detailed configuration of the battery module according to the embodiment.

FIG. 3 is a block diagram of a detailed configuration of the battery module.

The battery modules 13A and 13B have the same configurations; therefore, the battery module 13A will be described below as an example.

The battery module 13A includes: multiple reference battery cells 31 that are connected in series; a battery monitoring circuit 32 that measures a voltage between both ends of the reference battery cells 31 to monitor battery status; and a control arithmetic circuit 33 that controls ON and OFF of transistor switches SW1 and SW2, each including a field-effect transistor (FET) functioning as a circuit breaker element, based on an instruction from the vehicle side 12 or based on output from the battery monitoring circuit 32.

The battery module 13A further includes a current detection circuit 34 that detects a voltage between both ends of a current sensing resistor RS, one end of which is connected to a high-potential side of the reference battery cells 31 connected in series, to detect the amount of current flowing through the current sensing resistor RS, and that outputs a current-amount detection signal to the control arithmetic circuit 33. The battery module 13A further includes an insulated communication circuit 35 that communicates with the forklift electrical system unit 12 provided with a voltage system greatly different from a power supply system of the battery module 13A, in an electrically insulated manner.

The battery module 13A further includes a grounding resistor RG, one end of which is connected to the current sensing resistor RS, which has a high resistance value so as to enable to maintain the same insulating state as that of the insulated communication circuit 35, and the other end of which is connected to a reference potential (ground potential) of the battery management apparatus 15 via the communication connector TC. The battery module 13A further includes a fuse element 36 that fuses to interrupt overcurrent when the overcurrent flows between the positive connector TP and the reference battery cells 31.

Incidentally, the circuits as described above are configured as so-called extra-low voltage circuits. Furthermore, the control arithmetic circuit 33 functions as a charge and discharge control unit that controls charging and discharging. The extra-low voltage circuit is a circuit to which a voltage of, for example, 42.4 Vpeak or less or 60 Vdc or less is applied in a normal state or in a single failure condition. Moreover, the extra-low voltage circuit is configured as a secondary circuit, which is isolated from a dangerous voltage (for example, a voltage of 1 kVac or less) by basic insulation and to which a voltage that prevents a user from touching is applied.

Operation according to the embodiment will be described below.

In the state illustrated in FIG. 3 (normal use state), the positive connector TP of the battery module 13A is connected to a high-potential supply terminal of the forklift electrical system unit 12. Furthermore, the negative connector TM is connected to the positive connector TP of the battery module 13B. Moreover, the negative connector TM of the battery module 13B is connected to a low-potential supply terminal of the forklift electrical system unit 12 (the reference potential side or the ground side).

Therefore, the forklift electrical system unit 12, the reference battery cells 31, the transistor switches SW1 and SW2, the current sensing resistor RS, and the grounding resistor RG form a closed circuit via the communication connector TC.

Furthermore, in the normal use state, the transistor switches SW1 and SW2 are in closed states (ON states).

Therefore, the current detection circuit 34 detects a voltage between both ends of the current sensing resistor RS. Then, the current detection circuit 34 detects the current flowing through the current sensing resistor RS, and outputs a current-amount detection signal to the control arithmetic circuit 33.

Incidentally, I1 denotes the current flowing through the current sensing resistor RS when the communication connector TC is normally connected and the positive connector TP and the negative connector TM are normally connected while the insulated communication circuit 35 is enabled to communicate with the forklift electrical system unit 12.

Furthermore, I2 (<<I1) denotes the current flowing through the current sensing resistor RS when the communication connector TC is normally connected and when at least one of the positive connector TP and the negative connector TM is disconnected while the insulated communication circuit 35 is enabled to communicate with the battery management apparatus 15.

Assuming that Ith (I2<Ith<I1) denotes a threshold current, the control arithmetic circuit 33 compares the current corresponding to the current-amount detection signal input from the current detection circuit 34 with the threshold current Ith to determine whether all of the communication connector TC, the positive connector TP, and the negative connector TM are normally connected.

Incidentally, if the communication connector TC is not normally connected, the control arithmetic circuit 33 determines that power supply needs to be suspended and immediately switches the transistor switches SW1 and SW2 to open states (OFF states)

As a result of the determination as described above, when it is determined that the communication connector TC is normally connected and at least one of the positive connector TP and the negative connector TM is disconnected, that is, when the current corresponding to the input current-amount detection signal is smaller than the threshold current Ith, it is determined that the positive connector TP and the negative connector TM may be short circuited, and the transistor switches SW1 and SW2 are switched to the open states (OFF state).

In reality, the current obtained when the communication connector TC is normally connected and at least one of the positive connector TP and the negative connector TM is disconnected becomes approximately zero ampere (A) and can reliably be distinguished. Meanwhile, in this determination method, when the potential of the positive connector TP of a battery module 13 (the positive connector TP of the battery module 13A in the example in FIG. 3) serving as the highest potential with respect to the potential of the negative connector TM serving as the lowest potential is exceeded, the battery module 13 is not suspended. In this case, however, only the positive connector of the vehicle side serves as a connecting object of the negative connector TM, so that a short circuit does not occur due to erroneous connection.

In contrast, as a result of the determination, when the communication connector TC is normally connected and the positive connector TP and the negative connector TM are normally connected, that is, when the current corresponding to the input current-amount detection signal exceeds the threshold current Ith, it is determined that power supply can be performed without any difficulty, and the transistor switches SW1 and SW2 are maintained in the closed states (ON states).

As described above, according to the embodiment, when the power supply line including the reference battery cells 31 of the battery module 13A and the battery module 13B is not normally connected, power is not supplied to an external device. Therefore, even when the positive connector TP and the negative connector TM are erroneously connected, a short circuit condition does not occur.

Therefore, it becomes possible to reduce the influence of a connection failure of the connectors of the battery module 13A or the battery module 13B, enabling to improve the maintenance performance.

Furthermore, once the positive connector TP or the negative connector TM is disconnected, the battery module 13 enters a charge and discharge disabled state. When the positive connector TP or the negative connector TM is normally connected again, the battery module 13 enters a charge and discharge enabled state by using the activation method as described above for example.

In the above explanation, the battery module system is used as a power source of the forklift. In contrast, in a modification of the embodiment, the battery module system is applied to a so-called power supply backup system.

Figure 4:
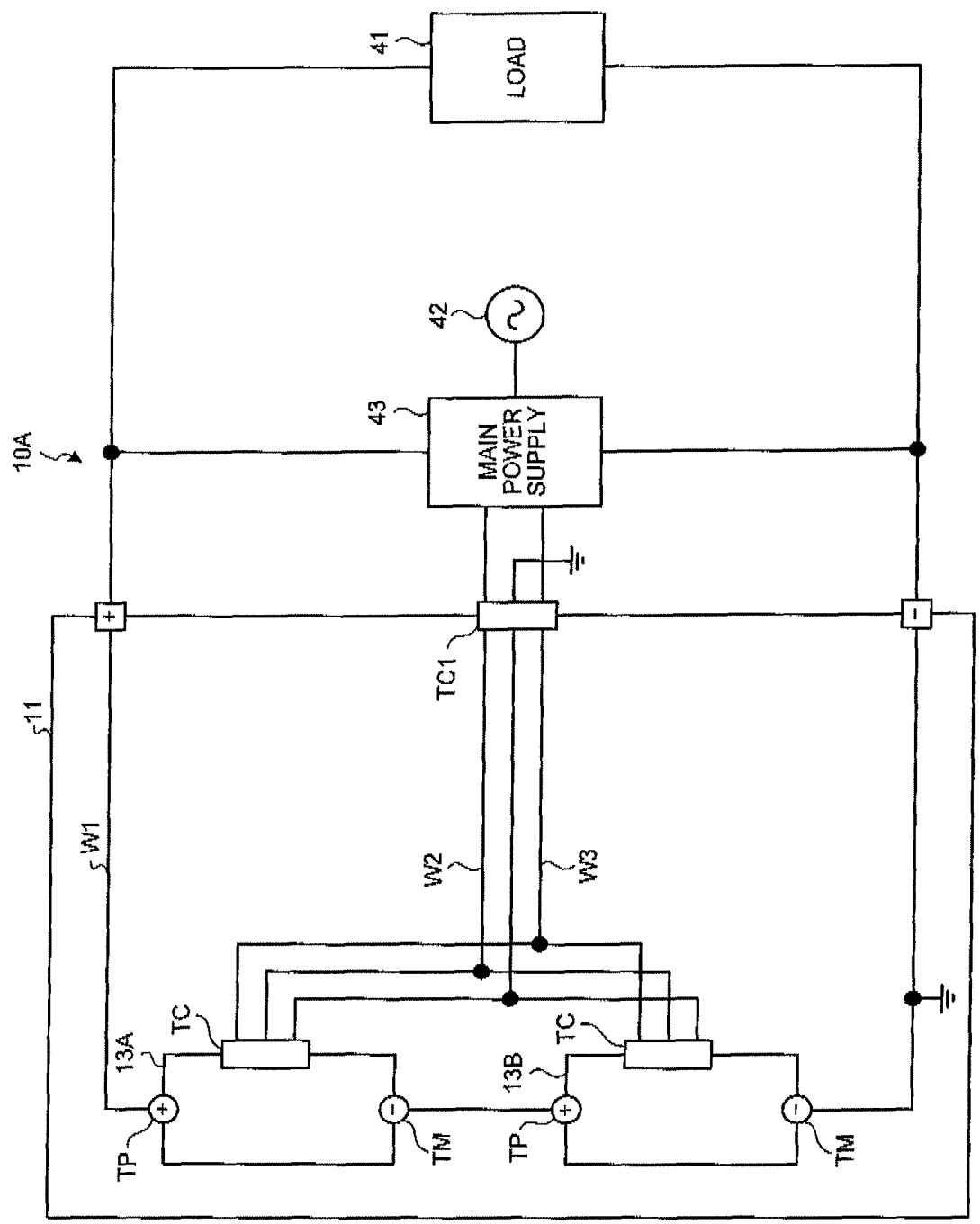
FIG. 4 is a schematic configuration diagram of a power supply backup system according to a modification.

FIG. 4 is a schematic configuration diagram of the power supply backup system.

In FIG. 4, the same components as those illustrated in FIG. 1 are denoted by the same reference numerals and symbols.

A power supply backup system 10A includes, when broadly divided: the battery module system 11 that supplies power; and a main power supply 43 that receives commercial AC power from a commercial power supply 42, converts the received power to supply power to a load 41, and charges the battery module system 11.

In a normal state, the load 41 is driven by receiving power supplied by the main power supply 43. However, when power supply by the commercial power supply 42 is suspended due to power outage or the like, the load 41, as a backup target, receives power from the battery module system 11.

In this case, the operation of the battery module system 11 according to the modification of the embodiment is the same as in the case of the electrical system 10 of the electric forklift. Specifically, when the power supply line including the reference battery cells 31 of the battery module 13A and the battery module 13B is not normally connected, power is not supplied to an external device.

Therefore, even when the positive connector TP and the negative connector TM are erroneously connected, a short circuit condition does not occur.

Furthermore, when the positive connector TP or the negative connector TM is disconnected and thereafter is normally connected again, the normal operating state is immediately resumed as long as the communication connector TC is normally connected.

Therefore, even in the power supply backup system, it becomes possible to reduce the influence of a connection failure of the connectors, enabling to improve the maintenance performance.

In the embodiment as described above, the vehicle controller 21 and the main power supply 43 control the entire operation. However, it may be possible to separately control the operation by the vehicle controller 21 or the main power supply 43 and a battery control unit (BCU).

The positive connector TP and the negative connector TM described above include not only those having so-called connector members, but also mere terminals.

In the above descriptions, the battery module system including the battery modules 13A and 13B forms a so-called extra-low voltage circuit; however, it is not limited thereto.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A battery module comprising:
   a main circuit through which a charge and discharge current of a battery flows via a positive connecting terminal and a negative connecting terminal;
   a resistive element that is provided in a current path branched from the main circuit, and that is able to form a closed circuit with an external control device via one of the positive connecting terminal and the negative connecting terminal while an insulating state between the main circuit and the external control device is maintained;
   a current-amount detection circuit that detects an amount of current flowing through the resistive element, and outputs a current-amount detection signal; and
   a breaker circuit that interrupts the current flowing through the main circuit when the amount of current flowing through the resistive element is smaller than a predetermined threshold current based on the current-amount detection signal.

2. The battery module of claim 1, further comprising:
   an insulated communication circuit that performs insulated communication with the external control device via a communication connector, wherein
   the resistive element forms a closed circuit with the external control device via the communication connector.

3. The battery module of claim 1, further comprising a charge and discharge control circuit that controls charge and discharge of the battery via the main circuit and that causes the battery module to enter a charge and discharge disabled state based on a predetermined instruction from the external control device.

4. The battery module of claim 1, wherein the resistive element is connected to a reference potential of the external control device.

5. The battery module of claim 4, wherein the reference potential is a ground potential.

6. The battery module of claim 1, wherein the current-amount detection circuit measures a voltage between both ends of a current-measuring resistive element connected to the resistive element in series, and generates the current-amount detection signal.

7. The battery module of claim 1, wherein the breaker circuit cancels interruption of the current flowing through the main circuit when the current flowing through the resistive element exceeds the predetermined current threshold based on the current-amount detection signal.

8. The battery module of claim 1, wherein the battery module is capable of being connected to at least one of other battery modules in series via the positive connecting terminal and the negative connecting terminal.

* * * * *